United States Patent
Nakazawa et al.

(10) Patent No.: US 9,316,287 B2
(45) Date of Patent: Apr. 19, 2016

(54) CHAIN FOR CONTINUOUSLY VARIABLE TRANSMISSION

(71) Applicant: JTEKT CORPORATION, Osaka-shi, Osaka (JP)

(72) Inventors: Teruhiko Nakazawa, Nagoya (JP); Ichiro Tarutani, Owariasahi (JP); Haruhiro Hattori, Nisshin (JP); Yuji Nagasawa, Seto (JP); Shinji Yamane, Kashiba (JP); Keisuke Mori, Yamatokoriyama (JP)

(73) Assignee: JTEKT CORPORATION, Osaka-shi (JP)

( * ) Notice: Subject to any disclaimer, the term of this patent is extended or adjusted under 35 U.S.C. 154(b) by 167 days.

(21) Appl. No.: 14/017,887

(22) Filed: Sep. 4, 2013

(65) Prior Publication Data

US 2014/0066243 A1 Mar. 6, 2014

(30) Foreign Application Priority Data

Sep. 6, 2012 (JP) ................. 2012-196003

(51) Int. Cl.
  *F16G 1/24* (2006.01)
  *F16G 5/18* (2006.01)
  *F16G 13/02* (2006.01)

(52) U.S. Cl.
  CPC ........ *F16G 13/02* (2013.01); *F16G 1/24* (2013.01); *F16G 5/18* (2013.01)

(58) Field of Classification Search
  CPC ......... F16G 13/00; F16G 13/02; F16G 13/06; F16G 13/07; F16G 13/08; F16G 5/18; F16H 9/00; F16H 9/02; F16H 9/24
  USPC .......... 474/237, 240, 242, 244, 245, 228, 229
  See application file for complete search history.

(56) References Cited

U.S. PATENT DOCUMENTS

| | | | | |
|---|---|---|---|---|
| 3,916,709 A | * | 11/1975 | Steuer et al. | 474/242 |
| 4,618,338 A | * | 10/1986 | Rattunde et al. | 474/245 |
| 4,631,042 A | * | 12/1986 | Rattunde | 474/8 |

(Continued)

FOREIGN PATENT DOCUMENTS

| | | |
|---|---|---|
| GB | 2 195 165 A | 3/1988 |
| JP | 2009-209992 A | 9/2009 |

(Continued)

OTHER PUBLICATIONS

Machine Translation of JP 2009/209992.*

(Continued)

*Primary Examiner* — Sang Kim
*Assistant Examiner* — Juan Campos, Jr.
(74) *Attorney, Agent, or Firm* — Oliff PLC

(57) ABSTRACT

A chain, wound to span between two pulleys each having facing conical surfaces able to change a distance therebetween and sandwiched by the facing conical surfaces, includes: link units each configured such that plate-shaped links, each having openings, are oriented in a chain circumferential direction and arranged in a chain width direction; and pins each extending through the openings of the links of the link units adjacent in the chain circumferential direction and each contacting the conical surfaces of sheaves at both ends thereof. A curvature radius of a shape curve representing a shape of each end face of each pin in a plane perpendicular to the chain circumferential direction is larger at an inner side in a pulley radial direction than at an initial contact point that is a contact point at the time when a load on each pin is 0.

6 Claims, 12 Drawing Sheets

(56) References Cited

U.S. PATENT DOCUMENTS

| | | | | |
|---|---|---|---|---|
| 4,710,154 | A | * | 12/1987 | Rattunde ........................ 474/242 |
| 4,813,918 | A | * | 3/1989 | Rattunde et al. ............... 474/245 |
| 4,909,778 | A | * | 3/1990 | Schonnenbeck .............. 474/245 |
| 5,792,013 | A | * | 8/1998 | Heinrich et al. ................... 474/8 |
| 6,293,887 | B1 | * | 9/2001 | Linnenbrugger et al. .... 474/245 |
| 6,416,433 | B1 | * | 7/2002 | Linnenbrugger ................. 474/8 |
| 2002/0107100 | A1 | * | 8/2002 | Wakabayashi et al. ....... 474/214 |
| 2007/0072722 | A1 | * | 3/2007 | Kamamoto ............... F16G 5/18 474/245 |
| 2007/0179003 | A1 | | 8/2007 | Vornehm et al. |
| 2007/0191166 | A1 | | 8/2007 | Yasuhara et al. |
| 2007/0298921 | A1 | * | 12/2007 | Simon ...................... F16G 5/18 474/215 |

FOREIGN PATENT DOCUMENTS

| | | | |
|---|---|---|---|
| JP | 2009209992 | A * | 9/2009 |
| JP | B2-4821022 | | 11/2011 |
| WO | 2005/085673 | A1 | 9/2005 |
| WO | 2007/076777 | A2 | 7/2007 |

OTHER PUBLICATIONS

Apr. 15, 2015 Extended European Search Report issued in European Application No. 13 18 3094.5.

Nov. 17, 2015 Office Action issued in Japanese Patent Application No. 2012-196003.

\* cited by examiner

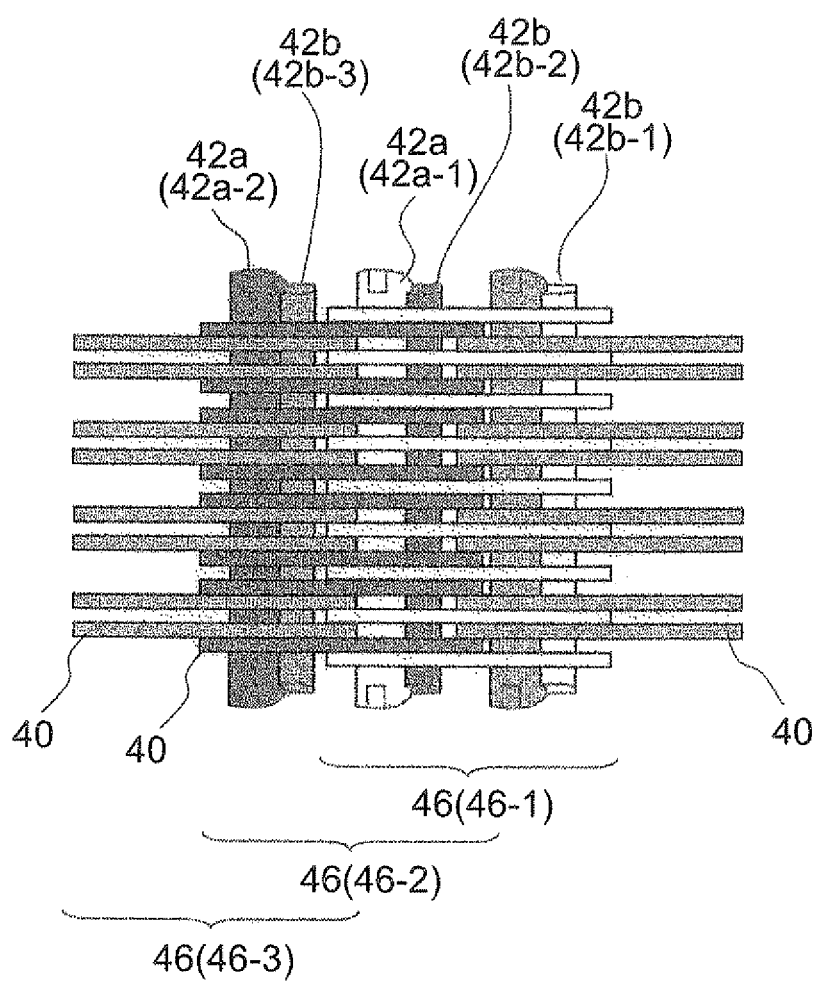

PIN CONTACT SIMPLE CURVATURE
RADIUS (LARGE)

PIN CONTACT SIMPLE CURVATURE
RADIUS (SMALL)

CHAIN FOR CONTINUOUSLY VARIABLE TRANSMISSION

INCORPORATION BY REFERENCE

The disclosure of Japanese Patent Application No. 2012-196003 filed on Sep. 6, 2012 including the specification, drawings and abstract is incorporated herein by reference in its entirety.

BACKGROUND OF THE INVENTION

1. Field of the Invention

The invention relates to a chain for a chain-type continuously variable transmission and, more particularly, to the structure of the chain.

2. Description of Related Art

There is a continuously variable transmission including two pulleys and a flexible endless member. The two pulleys each have a pair of facing conical surfaces that are able to change a distance therebetween. The flexible endless member is wound to span between the two pulleys. Rotation of one of the pulleys is transmitted to the other one of the pulleys by the flexible endless member. At this time, the radius of the flexible endless member wound on each pulley is changed by changing the distance between the corresponding conical surfaces, so it is possible to change a speed ratio. A chain (plate link chain) that is used as the flexible endless member of the continuously variable transmission is described in Japanese Patent No. 4821022.

The chain is configured such that links (plates 39, 40) arranged in a circumferential direction of the chain are coupled to each other by pins (pivotal pieces 32, 33) extending through these links. End faces of each pin contact the conical surfaces of each pulley, and each pin is sandwiched by each facing pair of sheaves. The shape of each end face of each pin, which contacts each sheave, is a circular arc in a plane perpendicular to the circumferential direction of the chain (see paragraph 0023, and the like). By forming each pin end face into a circular arc shape, an impact at the time when the pin grips each pulley is reduced.

SUMMARY OF THE INVENTION

In the case of the chain-type continuously variable transmission, an impact at the time when the pins of the chain grip the pulleys becomes vibratory force, thus causing noise. However, only when the end faces of each pin are formed in a circular arc shape to allow the pins and the pulleys to smoothly contact each other as much as possible as in the case of Japanese Patent No. 4821022, a sufficient effect of reducing noise may not be obtained.

The invention relates to a chain which reduces noise of a chain-type continuously variable transmission.

An aspect of the invention provides a chain for a continuously variable transmission, the chain being wound to span between two pulleys each having a pair of facing conical surfaces that are able to change a distance therebetween, the chain being sandwiched by the pairs of facing conical surfaces. The chain transmits power or rotation between the two pulleys. The chain includes: link units each configured such that a plurality of plate-shaped links, each having openings, are oriented in a circumferential direction of the chain and the plurality of plate-shaped links are arranged in a width direction of the chain; and pins each extending through the openings of the links of one of the link units and the openings of the links of another one of the link units, which is adjacent to the one of the link units in the circumferential direction of the chain, and the pins each contacting the pairs of conical surfaces at both ends thereof. A shape of each end face of each pin that contacts the conical surfaces of the pulley is such a shape that a curvature radius of a shape curve representing a shape in a plane perpendicular to the circumferential direction of the chain is larger at an inner side in a pulley radial direction than at an initial contact point, the initial contact point being a contact point at the time when a load on each pin in a center line direction is 0.

When the pin deforms due to the load on the pin in the center line direction, the location of the contact point moves toward the inner side in the pulley radial direction. When the load on the pin is close to 0, the curvature radius of the shape curve near the contact point is small, so the location of the contact point does not move so much. When the load increases and the contact point moves inward, the curvature radius of the shape curve at the contact point becomes large, and movement of the contact point increases. However, because movement of the contact point at the time when the load is small is small, so a distance of the contact point from the initial contact point is suppressed also when the load is large. When the load is large, the curvature radius is large, so the contact area increases and the contact pressure is reduced.

The shape curve may have a portion of which a curvature radius gradually increases from the initial contact point toward the inner side in the pulley radial direction.

The shape curve may have a portion having such a shape on the inner side in the pulley radial direction with respect to the initial contact point, the shape having a curvature radius at an arbitrary point is expressed by $r0+r\theta^\tau$, where an angle made between a tangent at the arbitrary point on the shape curve and a tangent at the initial contact point is denoted by $\theta$ and $r0$, $r$, $\tau$ are arbitrary real numbers.

In the above-described $r0+r\theta^\tau$, the arbitrary real number $\tau$ may be 1. This curve is an involute curve.

An arrangement pitch of the pins in the circumferential direction of the chain may be a random pitch.

A location of the initial contact point of each pin may deviate from a center line of each pin toward an outer side in the pulley radial direction.

A rate of the deviation may be larger than or equal to 0.16. Moreover, the rate of the deviation may be smaller than or equal to 0.38.

The locations of the contact points of each pin with respect to the conical surfaces of the pulley are kept at an outer side in the pulley radial direction. Thus, each pin easily deforms, and an impact at the time of gripping of each pin is suppressed, so noise is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a plan view that shows the structure of the chain;

DETAILED DESCRIPTION OF EMBODIMENTS

Figure 1:
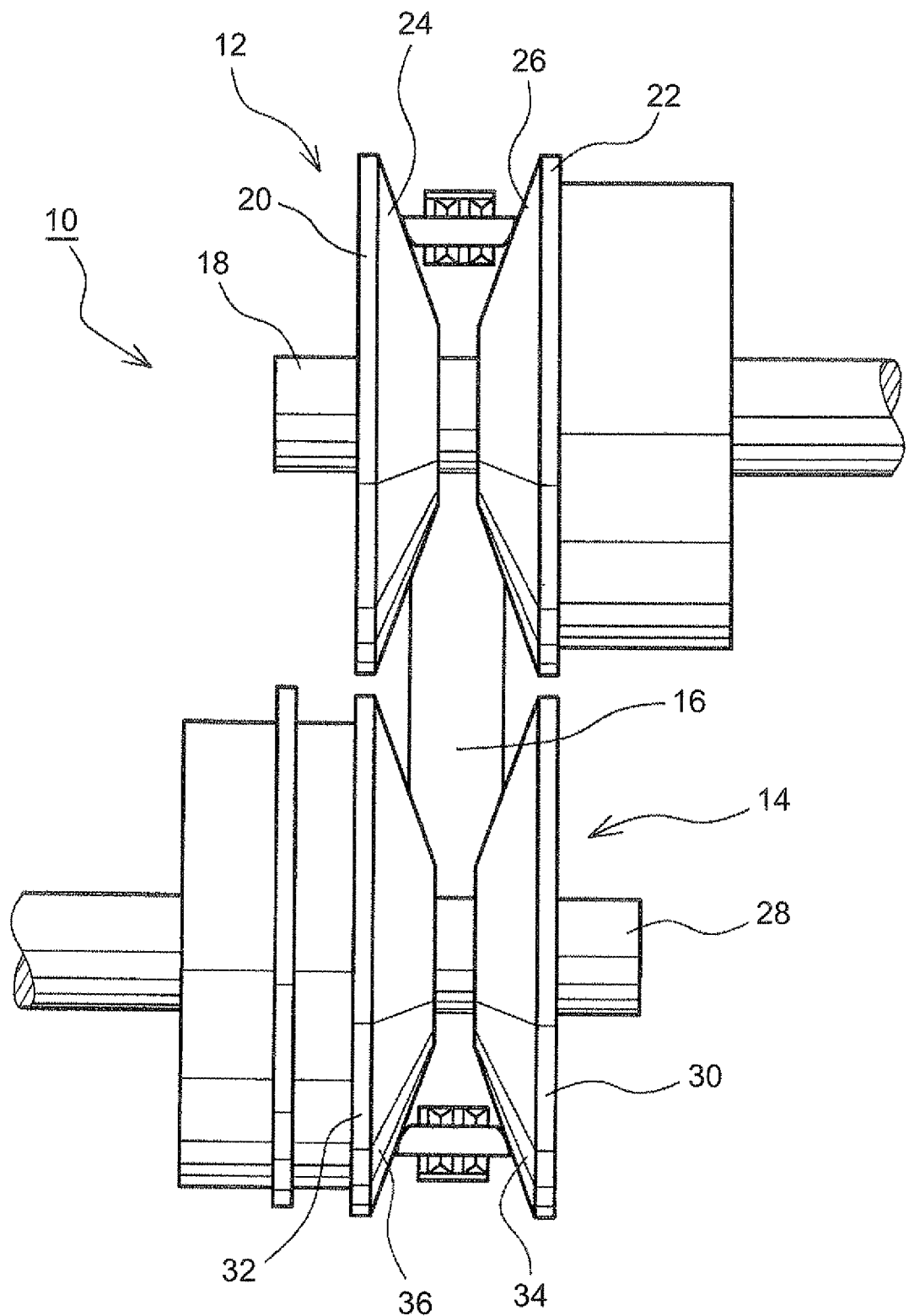
FIG. 1 is a view that shows a relevant portion of a chain-type continuously variable transmission.

Hereinafter, an embodiment of the invention will be described with reference to the accompanying drawings. FIG. 1 shows a relevant portion of a chain-type continuously variable transmission 10. The chain-type continuously variable transmission 10 includes two pulleys 12, 14 and a chain 16 wound to span between these pulleys. One of the pulleys is referred to as the input pulley 12, and the other one of the pulleys is referred to as the output pulley 14. The input pulley 12 includes a fixed sheave 20 and a movable sheave 22. The fixed sheave 20 is fixed to an input shaft 18. The movable sheave 22 is slidably movable on the input shaft 18 along the input shaft 18. Mutually facing surfaces of the fixed sheave 20 and movable sheave 22 each have a conical side face shape, and these surfaces are referred to as conical surfaces 24, 26. Here, each conical surface includes a perfect (normal) conical surface and a slightly convex or slightly concave substantially conical surface. A V-shaped groove is formed by the conical surfaces 24, 26, and the chain 16 is located in the groove such that the side surfaces of the chain 16 are sandwiched by the conical surfaces 24, 26. The output pulley 14, as well as the input pulley 12, includes a fixed sheave 30 and a movable sheave 32. The fixed sheave 30 is fixed to an output shaft 28. The movable sheave 32 is slidably movable on the output shaft 28 along the output shaft 28. Mutually facing surfaces of the fixed sheave 30 and movable sheave 32 each have a conical side face shape, and these surfaces are referred to as conical surfaces 34, 36. A V-shaped groove is formed by the conical surfaces 34, 36, and the chain 16 is located in the groove such that the side surfaces of the chain 16 are sandwiched by the conical surfaces 34, 36.

The arrangement of the fixed sheave and movable sheave of the input pulley 12 is opposite to the arrangement of the fixed sheave and movable sheave of the output pulley 14. That is, the movable sheave 26 is located at the right side in FIG. 1 in the input pulley 12; whereas the movable sheave 32 is located at the left side in the output pulley 14. By sliding the movable sheaves 22, 32, a distance between the mutually facing conical surfaces 24, 26 and a distance between the mutually facing conical surfaces 34, 36 are varied, and the width of each of the V-shaped grooves formed by these conical surfaces varies. Due to the variation in the groove width, the winding radius of the chain varies. That is, when the movable sheave 22 moves away from the fixed sheave 20 or the movable sheave 32 moves away from the fixed sheave 30, the corresponding groove, width expands, and the chain 16 moves to a deeper location of the groove, so the winding radius reduces. On the other hand, when the movable sheave 22 approaches the fixed sheave 20 or the movable sheave 32 approaches the fixed sheave 30, the corresponding groove width narrows, and the chain 16 moves to a shallower location of the groove, so the winding radius increases. A variation in the winding radius is inverted between the input pulley 12 and the output pulley 14. Thus, a slack of the chain 16 is prevented. As the movable sheave 22 or the movable sheave 32 slides, the width of the corresponding V-shaped groove continuously varies, and the winding radius also continuously varies. Thus, it is possible to continuously vary the speed ratio at which power is transmitted from the input shaft 18 to the output shaft 28.

Figure 2:
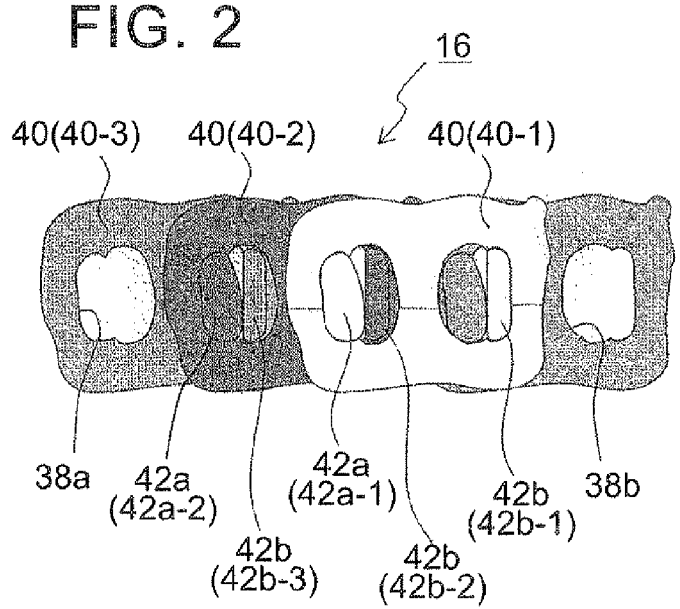
FIG. 2 is a side view that shows the structure of a chain.
Figure 3:
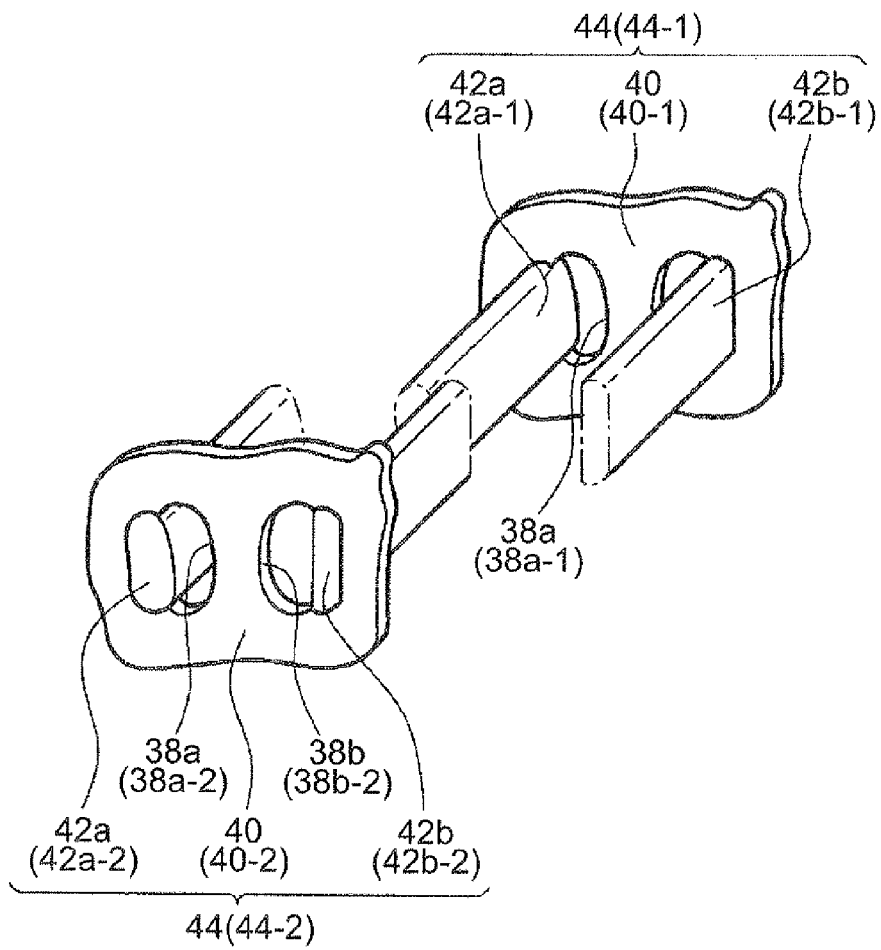
FIG. 3 is a perspective view for illustrating the structure of the chain.

FIG. 2 to FIG. 4 are detailed views that show the structure of the chain 16. In the following description, a direction in which the chain 16 extends is referred to as circumferential direction, a direction perpendicular to the circumferential direction and parallel to the input shaft 18 and the output shaft 28 is referred to as width direction, and a direction perpendicular to both the circumferential direction and the width direction is referred to as thickness direction. FIG. 2 is a view that shows part of the chain 16 when viewed in the width direction. FIG. 3 is an exploded view of an extracted part of the chain 16. FIG. 4 is a view that shows part of the chain 16 when viewed in the thickness direction from an outer peripheral side.

In FIG. 2, a horizontal direction is the circumferential direction, a vertical direction is the thickness direction, and a direction extending through the sheet is the width direction. In addition, an upper side is an outer side of the chain 16. The chain 16 is formed by combining plate-shaped links 40 and rod-shaped pins 42a, 42b. Each link 40 has openings 38a, 38b. The individual links 40 have the same shape including the thickness, the rod-shaped pins 42a have the same shape, and the rod-shaped pins 42b have the same shape. The links 40 are arranged in the width direction in a predetermined pattern (see FIG. 4), and each pair of pins 42a, 42b respectively extend through the openings 38a, 38b at both ends of the links 40. When the chain 16 is sandwiched by the pairs of sheaves, both ends of each of the pair of pins 42a, 42b or both ends of any one of the pair of pins 42a, 42b contact the conical surfaces 24, 26 of the input pulley 12 and the conical surfaces 34, 36 of the output pulley 14. A set of the pair of pins 42a, 42b and the links 40 through which the pins extend is referred to as chain element 44 (see FIG. 3).

FIG. 3 shows the two chain elements 44-1, 44-2 in a partially omitted state. Suffixes "-1", "-2", "-3" are used when the chain element and the links and pins of that chain element are distinguished from the other elements. The chain element 44-2 is formed of the plurality of links 40-2 and the pair of pins 42a-2, 42b-2 extending through the links 40-2. The pins 42a-2, 42b-2 are respectively press-fitted to the openings 38a-1, 38b-1 at both ends of the links 40-2 or fixed in position and connected by another method. The chain element 44-1 is also similarly formed of the plurality of links 40-1 and the pair of pins 42a-1, 42b-1 extending through the links 40-1. In addition, the plurality of the links 40 of one chain element constitute a link unit 46.

The adjacent chain elements 44-1, 44-2 are coupled by respectively passing the pins 42a, 42b through the openings 38b, 38a of the counterpart links 40. As shown in FIG. 3, the pin 42b-2 of the left-side chain element 44-2 is arranged in the opening 38a-1 so as to be located on the right side of the pin 42a-1 of the right-side chain element 44-1. On the other hand, the pin 42a-1 of the right-side chain element 44-1 is arranged in the opening 38b-2 so as to be located on the left side of the pin 42b-2 of the left-side chain element 44-2. The pins 42b-2, 42a-1 contact each other at their side surfaces, and the tension of the chain 16 is transmitted. When the chain 16 bends, the adjacent pins, such as the pins 42b-2, 42a-1, move so as to roll on mutual contact surfaces, and bending is allowed.

Figure 5A:
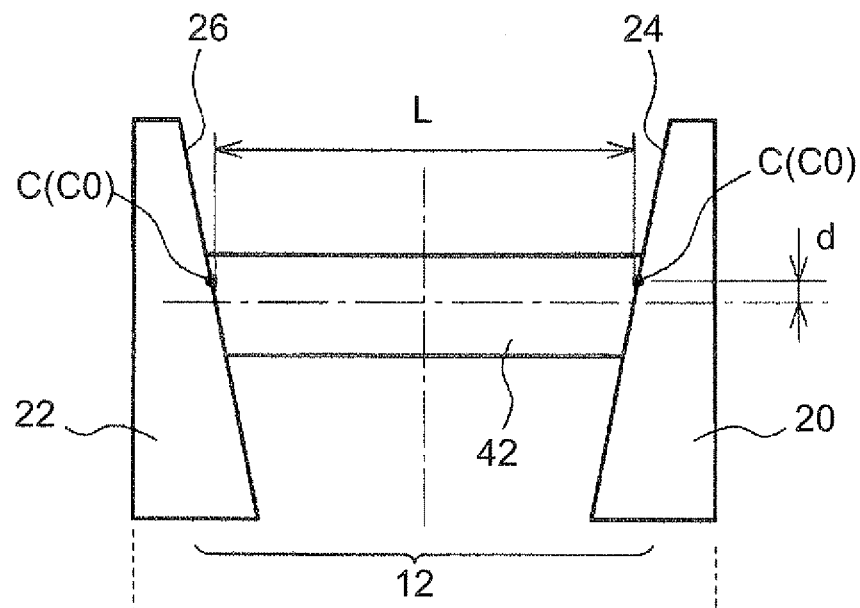
FIG. 5A and FIG. 5B are views that illustrate deformation of each pin.
Figure 5B:
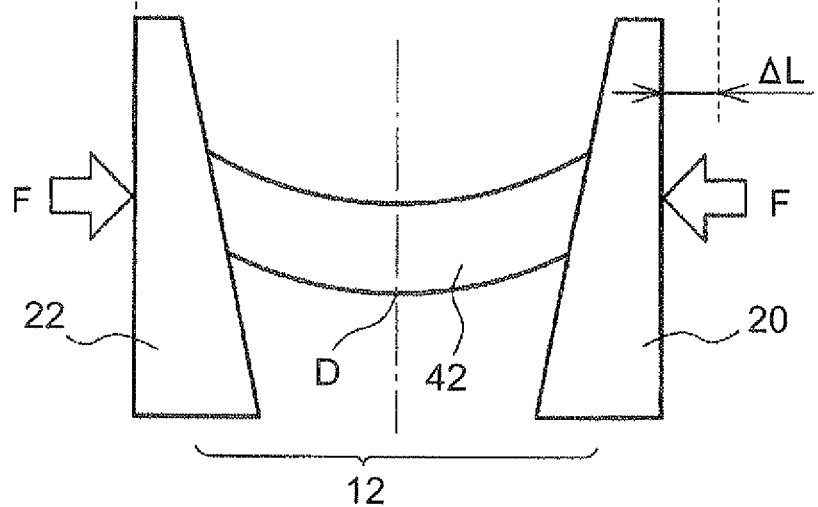

FIG. 5A and FIG. 5B are views that illustrate deformation of each pin when the pin is sandwiched by the pair of sheaves. FIG. 5A and FIG. 5B show the input pulley 12. However, the same applies to the output pulley. FIG. 5A and FIG. 5B show the pin that contacts the conical surfaces 24, 26 of the sheaves of the input pulley. Hereinafter, for the sake of simplification, description will be made by assigning reference numeral 42 to the pin that contacts the conical surfaces among the pins 42a, 42b.

FIG. 5A and FIG. 5B show the schematic shapes of the pin 42, fixed sheave 20 and movable sheave 22 in cross section perpendicular to the circumferential direction of the chain 16. In addition, the links 40 of the chain are omitted. In a state where the pin 42 is not receiving force from the two sheaves 20, 22 of the input pulley 12, the length (free length) of the pin 42 along the center line is L (see FIG. 5A). When the pin 42 is sandwiched by a load F between the sheaves 20, 22, the pin 42 bends toward an inner side in a pulley radial direction and then the length in the pin central axis direction reduces as shown in FIG. 5B. A variation in the length of the pin 42 at this time is denoted by ΔL. A value obtained by dividing the length variation ΔL by the load and the pin free length L is defined as a deformation rate of the pin length, and a deformation amount of the pin is normalized.

$$\text{(Deformation rate of pin length)} = \Delta L/(F \times L) \quad (1)$$

Figure 6:
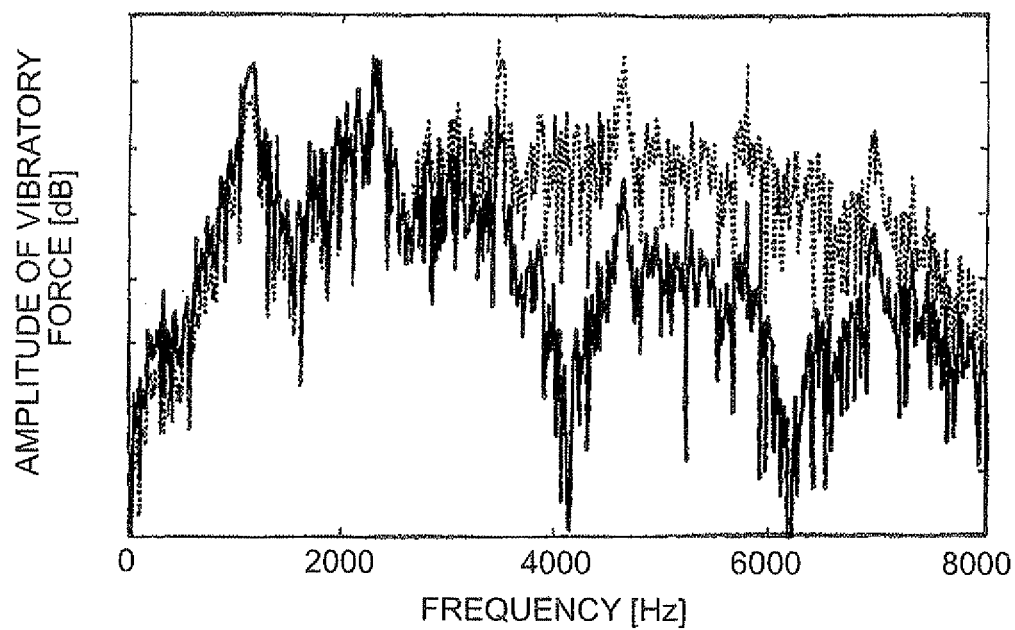
FIG. 6 is a graph that shows a variation in frequency distribution of vibratory force at the time when the deformation amount of each pin is changed.

FIG. 6 is a graph that shows calculation results of comparison in frequency characteristic of vibratory force when a difference in deformation amount of the pin is provided. Frequency distributions at the same rotation speed are shown. The graph indicated by the continuous line shows the characteristic of the deformation amount of the pin, which is twice as large as the deformation amount of the pin for the graph indicated by the dashed line. By increasing the deformation amount of the pin, it is effective to reduce high-order components, particularly, third and higher-order components, and it is recognized as being effective in a 3 kHz and higher band, particularly, a 3 to 5 kHz band.

Figure 7:
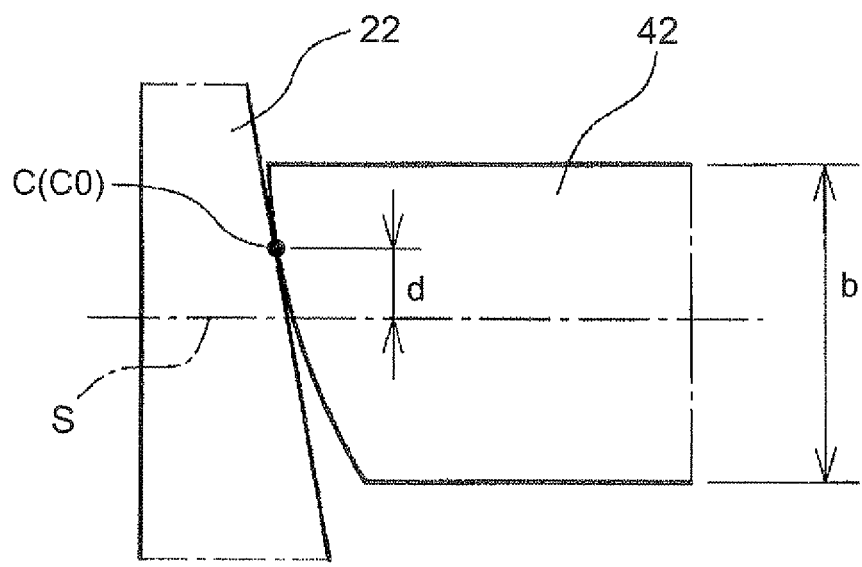
FIG. 7 is a detailed view that shows a state where each pin contacts a pulley.

In the present embodiment, in order to vary the deformation rate of the pin 42, the locations of contact points C between the pin 42 and the conical surfaces 24, 26 of the sheaves when no load F is applied are shifted from the center line of the pin. The contact points at the time when no load is applied (F=0) are referred to as "initial contact points C0" hereinafter. Each end face of the pin 42 is slightly curved. By shifting the location of the vertex of the curved shape, it is possible to change the location of each initial contact point C0. FIG. 7 is an enlarged view of a portion near the initial contact point C0 of FIG. 5A, and shows the cross section perpendicular to the circumferential direction of the chain as in the case of FIG. 5A. As shown in FIG. 7, the location of the initial contact point C0 between the pin 42 and the sheave 22 is defined by a distance d from a center line s passing through the center of a size b of the pin 42 in the pulley radial direction.

In addition, a value obtained by dividing the deviation amount d by the size b is referred to as deviation rate.

$$\text{(Deviation rate)} = d/b \quad (2)$$

Here, an upward deviation from the center line of the pin in FIG. 7 in the drawing is positive, and a downward deviation is negative.

Because each pin end face is curved, when the pin 42 deforms due to the load F, the location of each contact point C of the pin 42 moves radially inward (downward in FIG. 5A and FIG. 7) of the input pulley 12. In addition, by applying the load F, each end face of the pin 42 is flattened, and a portion that contacts the conical surface becomes a contact region having an area. A point at which the contact pressure is maximum in the contact region is referred to as the contact point C hereinafter.

Figure 8:
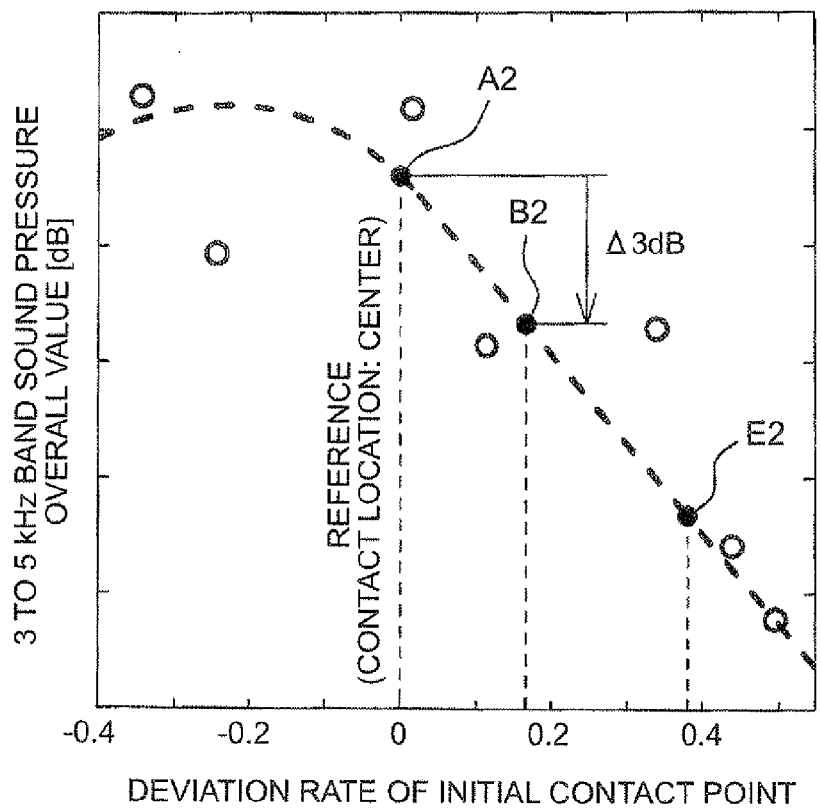
FIG. 8 is a graph that shows the correlation between a deviation rate of an initial contact point and a deformation rate of pin length.

FIG. 8 is a graph that shows the correlation between a deviation rate of the contact point and a sound pressure (overall value) in a 3 to 5 kHz band. As shown in the graph, it is understandable that it is more effective to reduce noise as the deviation rate of the initial contact point increases, that is, the location of the initial contact point C0 is set at an outer side in the pulley radial direction. Thus, after the pin 42 is sandwiched by the sheaves 20, 22 and the load F is applied as well, it is desirable that each contact point C does not move as much as possible and is located at the outer side. This is the first request. When this request is achieved, the pin 42 deforms and further absorbs an impact.

Figure 9A:
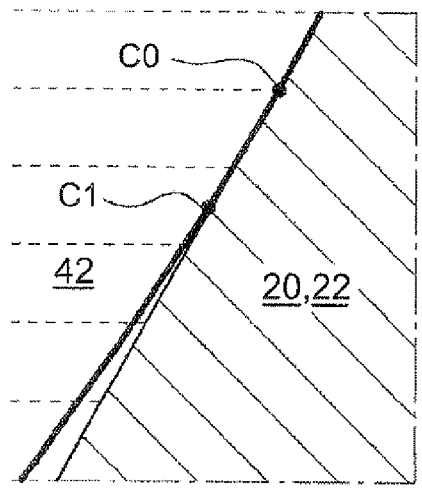
FIG. 9A and FIG. 9B are views that show a difference in displacement of a contact point depending on a curvature radius.
Figure 9B:
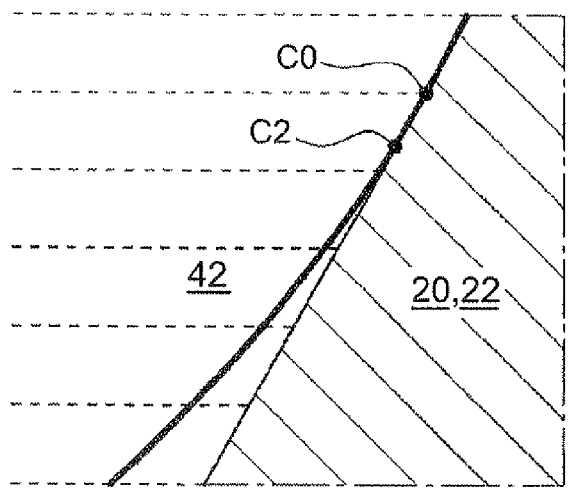

FIG. 9A and FIG. 9B are views that show states of movement of each contact point at the time when the curve of each pin end face is a circular arc curve, that is, a curve having a simple curvature radius. FIG. 9A shows the case where the curvature radius is large. FIG. 9B shows the case where the curvature radius is small. Between both cases, the locations of the initial contact points C0 are the same, and the contact points at the time when the same load is applied, that is, when bending of the pin 42 is the same, are respectively indicated by reference signs C1, C2. From FIG. 9A and FIG. 9B, it is understandable that movement of the contact point increases as the curvature radius increases. Thus, in order to keep the location of the contact point C at the radially outer side of the pulley as much as possible, the curvature radius is desirably small. On the other hand, when the curvature radius is reduced, the contact area reduces, and the contact pressure increases. Thus, when the load F is large, the curvature radius is desirably large. This is the second request.

The above-described two requests are achieved by reducing the curvature radius at each initial contact point C0 or near each initial contact point C0 and increasing the curvature radius at the inner side in the pulley radial direction. By reducing the curvature radius at each initial contact point C0 or around each initial contact point C0, when the load F in the pin center line direction is small, it is possible to suppress movement of each contact point C. At this time, the load F is small, so the contact pressure do not so increase as to influence the strength of the pin, or the like. On the other hand, when the curvature radius is large, movement of each contact point increases with respect to deformation of the pin. However, because the displacement of each contact point C within the range in which the load F is small is small, it is possible to suppress the displacement from the initial contact point C0 even when the load F is large. This is easily understandable if it is assumed that the load F gradually increases and becomes a high load. When the load is small, movement of the contact point C is small with an increase in load; however, movement increases with an increase in load as the load increases. However, because the displacement at the small load is small, a total displacement until the load has increased is suppressed accordingly. On the other hand, when the curvature radius at the contact point is large, the contact region increases, so it is possible to decrease the contact pressure.

Figure 10:
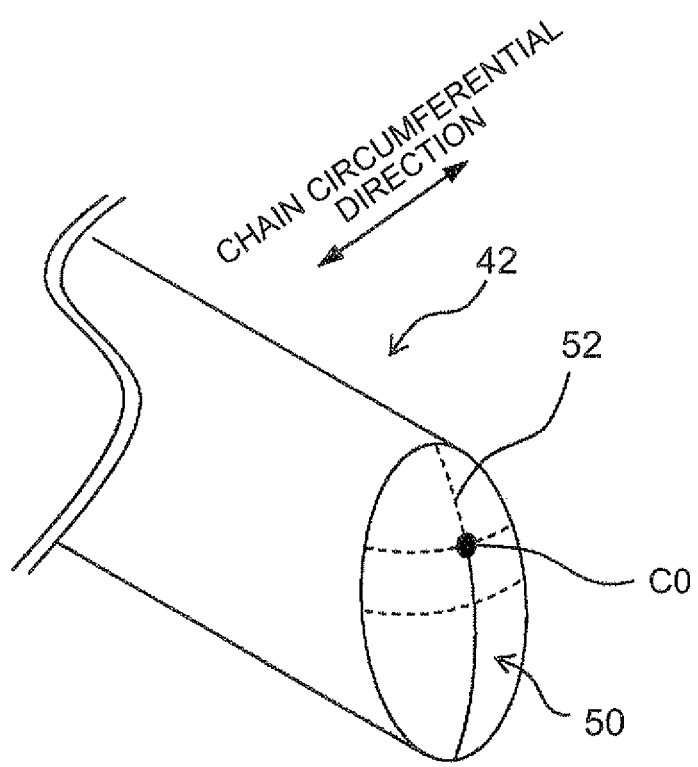
FIG. 10 is a perspective view that shows the shape of each pin end portion.

A further specific example of the shape of each pin end face will be described. FIG. 10 is a detailed view of the end face 50 of the pin 42. The pin end face 50 is formed in a substantially convex shape. A direction indicated by the double-headed arrow in the drawing is the circumferential direction of the chain. In the drawing, the vertical direction is the thickness direction of the chain, and this direction coincides with the pulley radial direction when the pin 42 is located in the pulley, that is, the pin 42 is sandwiched by the sheaves. In the drawing, the upper side is the outer side in the pulley radial direction, and the lower side is the inner side in the pulley radial direction. The longitudinal direction of the pin 42 is the width direction of the chain, and this direction coincides with a direction in which the rotation axis of the pulley extends. The shape of each pin end face in a plane passing through the center line of the chain and perpendicular to the circumferential direction of the chain is referred to as shape curve. The shape curve is shown by the dashed line indicated by reference numeral 52 and the continuous line extended from the dashed line in FIG. 10. The initial contact point C0 is allowed to be located on the outer side in the pulley radial direction with respect to the center line of the pin. The contact point C moves from the initial contact point C0 along the continuous line portion of the shape curve 52 as the load is applied. The contact point C does not need to move to the lower end of the shape curve 52.

The shape curve may be a curve formed of continuous circular arcs having two or more curvature radii. At this time, the curvature radius of a first portion is larger than the curvature radius of a second portion located on the outer side in the pulley radial direction with respect to the first portion. The curvature radius may be continuously varied toward the inner side in the pulley radial direction.

Figure 11:
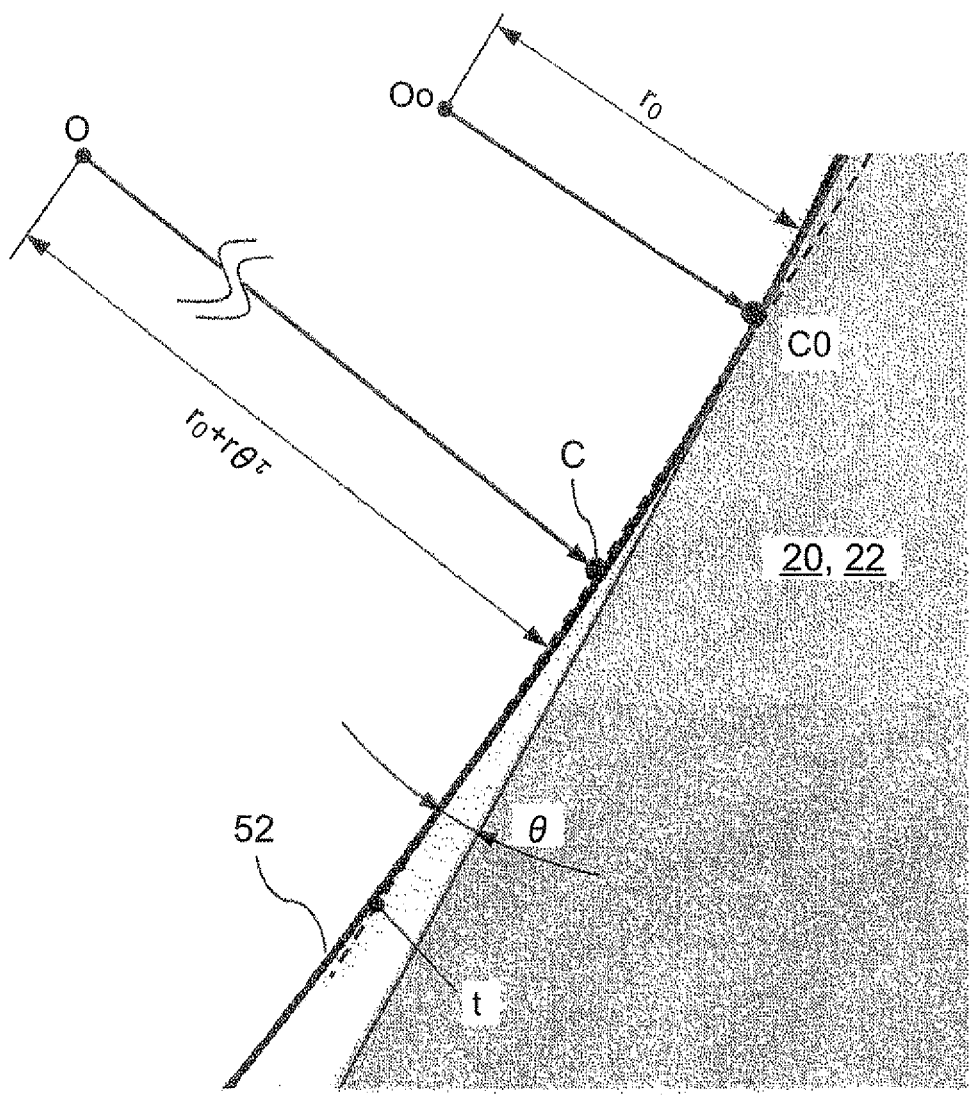
FIG. 11 is a view for illustrating the shape of each pin end face according to an embodiment of the invention.

FIG. 11 is a detailed view of an example of the shape curve 52. The shape curve 52 shown in FIG. 11, where an angle made between a tangent at an arbitrary point of the curve and a tangent at the initial contact point C0 is θ, has a portion in which the curvature radius at the arbitrary point is expressed as follows.

$$r0 + r\theta^\tau \text{ (where } r0, r, \tau \text{ are arbitrary real numbers)} \quad (3)$$

The portion expressed by the above mathematical expression (3) may be regarded as a portion that may bend to contact the sheave due to the load. Specifically, for example, the portion ranges from the initial contact point C0 to the contact point C or a contact region at the time when the maximum load is applied to the pin toward the inner side in the pulley radial direction. When the pin 42 contacts the sheaves 20, 22 at the point C on the shape curve 52, the curvature radius of the shape curve is expressed by $r0 + r\theta^\tau$, which is larger than $r0$ at the initial contact point C0. The mathematical expression (3) expresses an involute curve when $\tau=1$.

Figure 12:
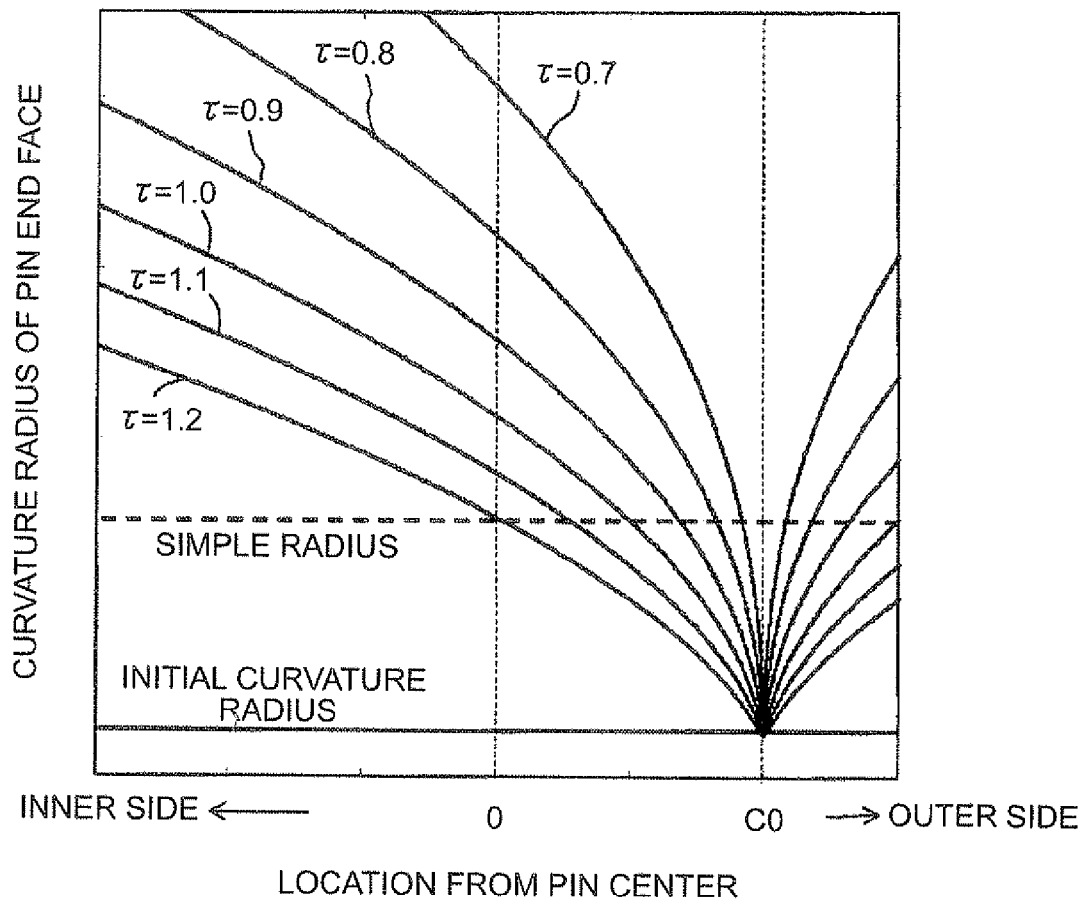
FIG. 12 is a graph that shows a curvature radius of each pin end face with respect to a position in a chain thickness direction.

FIG. 12 is a graph that shows a variation in the curvature radius of the shape curve when the value of τ is varied. The abscissa axis represents a location with respect to the pin center (0), and the right side indicates the outer side in the pulley radial direction. The location of the initial contact point is indicated by C0. It is understandable that the curvature radius gradually increases from the initial contact point C0.

The shape of the pin end face 50 in cross section taken by the plane perpendicular to the thickness direction of the chain may have a simple curvature radius. In the range in which contact with the sheave is assumed in the thickness direction, the pin end face 50 may have a common sectional shape.

Figure 13:
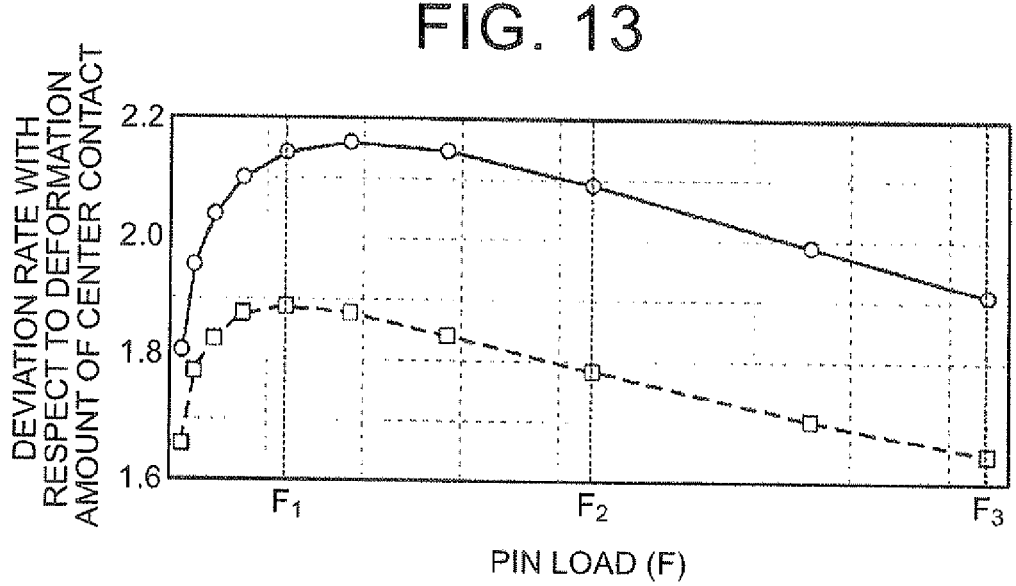
FIG. 13 is a graph that shows a deformation rate of pin length with respect to a pin load as compared to the case where the pin contacts the pulley at a pin center line.

FIG. 13 is a graph that shows comparison in the amount of deformation using a deformation rate of pin length defined by the mathematical expression (1) as compared to the case where the contact point is located at the pin center line. That is, a deformation rate of 2.0 means that a deformation is twice as large as a deformation for a deformation rate of pin length in the case where the pin contacts the sheave at the pin center line. The dashed line in the graph shows the case where the initial contact point C0 is shifted to the outer side and the shape curve has a simple curvature radius. The continuous line in the graph indicates the case where the initial contact point C0 is set as in the case of the dashed line and the shape curve has a curvature radius obtained by setting τ=1 in the mathematical expression (3). The parameters in the mathematical expression (3) are set such that the maximum contact pressure at the maximum load is equal to that in the case of the simple curvature radius (dashed line).

Figure 14:
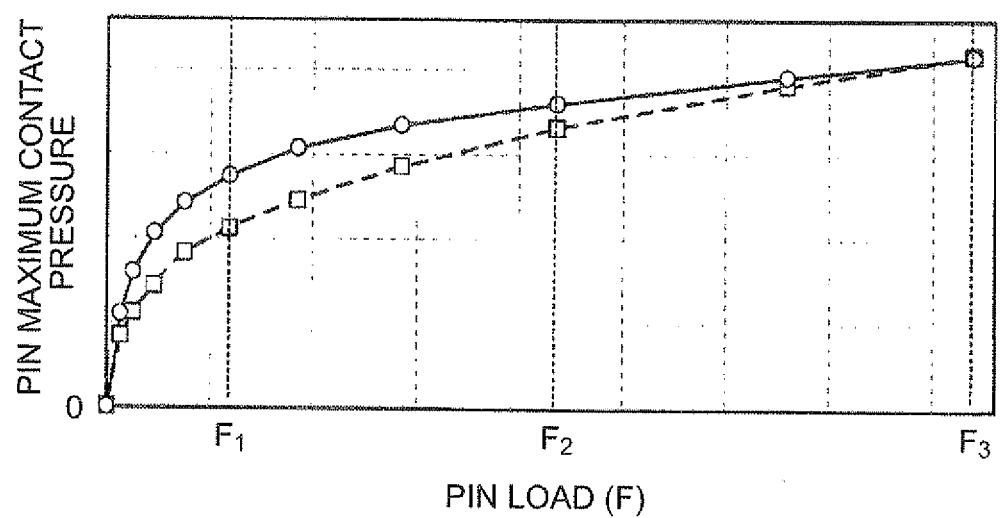
FIG. 14 is a graph that shows a maximum contact pressure of each pin as compared to the case where the pin contacts the pulley at the pin center line.

FIG. 14 is a graph that shows a maximum contact pressure for a load F applied to the pin in the center line direction. Differentiation between the continuous line and the dashed line is similar to that of FIG. 13. As described above, the maximum contact pressure at the maximum load is equal between the continuous line and the dashed line.

It is understandable from FIG. 13 that the pin deforms by a larger amount in the case of the shape curve expressed by the mathematical expression (3) than in the case of a simple curvature radius. Thus, an impact at the time when the pin grips the pulley is reduced, so it can be expected to advantageously reduce noise. In addition, it is understandable from FIG. 14 that the contact pressure increases but the amount of increase in the contact pressure is not so large.

Figure 15:
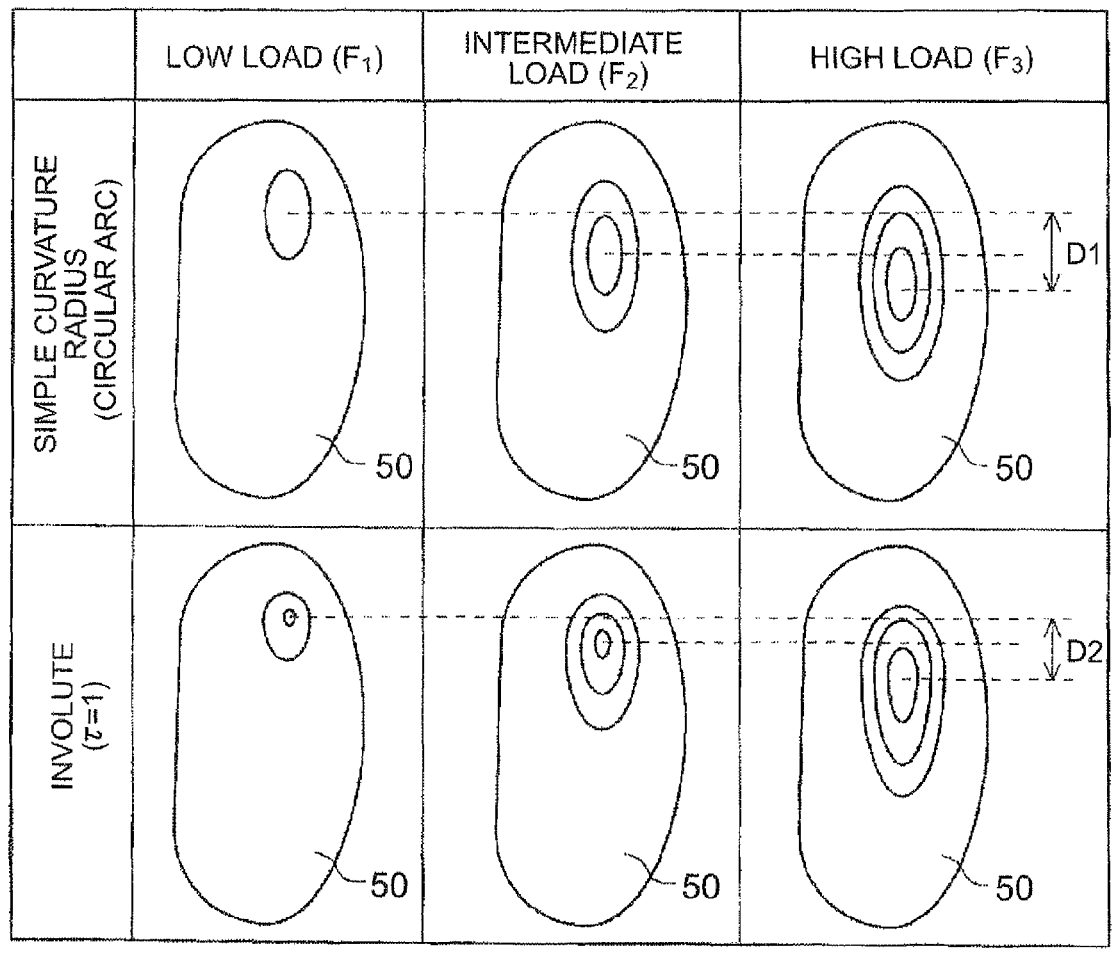
FIG. 15 is a view that shows a contact pressure distribution at each pin end face.

FIG. 15 is a view that shows a contact pressure distribution at the time when the load F is applied to the pin. Rings drawn in each pin end face 50 are contour lines connecting equal contact pressures. Inner contour lines indicate higher contact pressures. A low load F1, an intermediate load F2 and a high load F3 respectively correspond to "F1", "F2", "F3" of the pin load shown in FIG. 13 and FIG. 14. In addition, the upper row indicates contact pressure distributions in the case where the shape curve 52 is a simple curve, that is, a circular arc. That is, the upper row corresponds to the cases indicated by the dashed lines in FIG. 13 and FIG. 14. The lower row indicates contact pressure distributions in the case where the shape curve 52 is obtained by setting τ=1 in the mathematical expression (3), that is, the shape curve 52 is an involute curve. That is, the lower row corresponds to the cases indicated by the continuous lines in FIG. 13 and FIG. 14. At the low load F1, the curvature radius at the contact point is smaller in the case of the involute curve than in the case of the circular arc, so the contact region is narrow and the maximum contact pressure is also high. The maximum contact pressure at this time is not so high because of a small load, and does not influence the strength, durability, and the like, of the pin. The parameters (r, r0) in the mathematical expression (3) are determined such that the maximum contact pressure is equal to that in the case of the circular arc at the high load F3. The contact region is also substantially equal. A displacement D2 of the contact point from the low load F1 to the high load F3 in the case of the involute curve is smaller than a displacement D1 of the contact point (D1>D2). By employing the involute curve, the contact point is located at the outer side in the pulley radial direction at a high load, so the pin 42 easily deforms and it can be expected to advantageously reduce noise.

Figure 16:
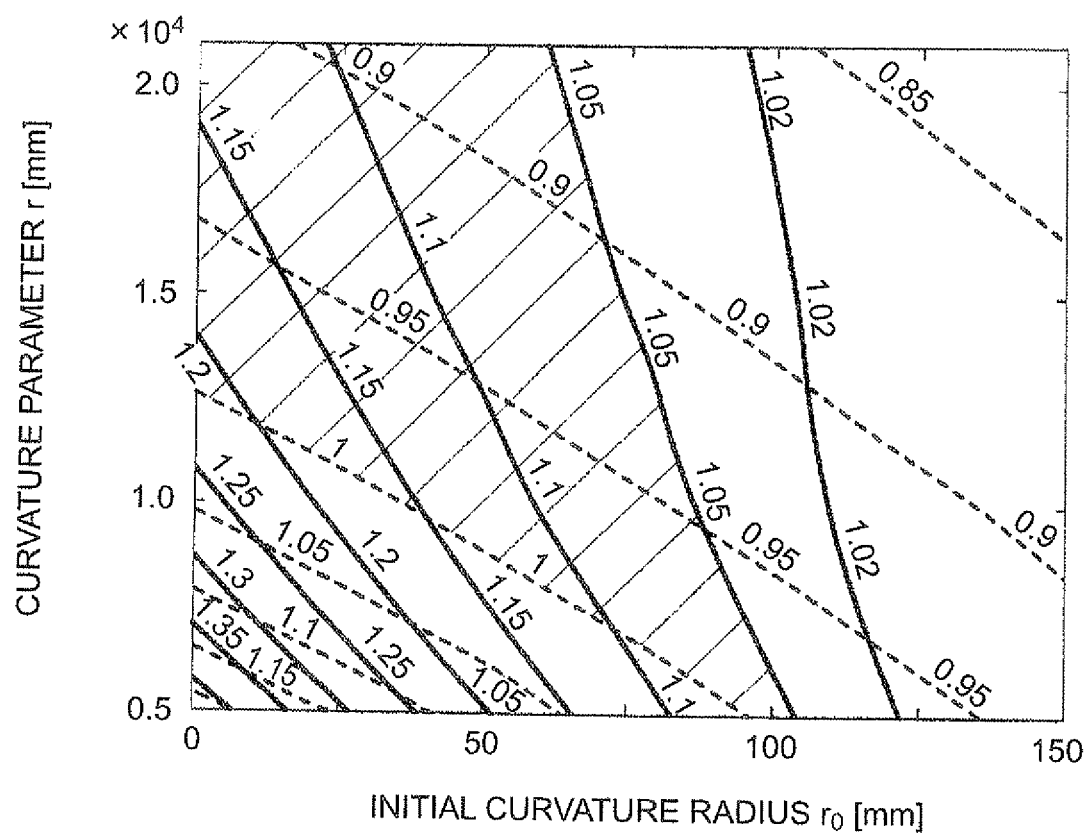
FIG. 16 is a graph that illustrates a selection range of a curvature parameter r and an initial curvature radius r0.

FIG. 16 is a view that illustrates a method of setting the parameters (curvature parameter r, initial curvature radius r0) in the mathematical expression (3) that expresses an example of the shape curve. In this method, the shape curve expressed by the mathematical expression (3) is evaluated in comparison with the shape curve 52 having a simple curvature radius (150 mm). Here, the involute curve (τ=1) will be described by way of example. In addition, comparison is made in the case where the winding radius of the chain is minimum and the pin load F is maximum. This is the condition that the contact pressure on the pin end face is the highest.

In FIG. 16, comparison in deformation rate of pin length, defined by the mathematical expression (1), is indicated by the continuous lines. Numeric numbers assigned to the lines indicate how much deformation of pin length varies as compared to the case of a simple curvature radius. For example, when the numeric value is 1.1, it indicates that deformation occurs by a factor of 1.1. Further deformation is required as compared to the case of a simple curvature radius, so, for example, the parameters (r, r0) are selected so as to fall within a region on the left side of the continuous line indicated by the numeric value 1.05.

The dashed lines in FIG. 16 indicate comparison in maximum value of contact pressure. When the numeric value is 0.9, it indicates that the maximum contact pressure is 0.9 times as that in the case of a simple curvature radius (150 mm). If the simple curvature radius is determined in consideration of the strength, durability, and the like, of the pin, receiving a contact pressure higher than that of the simple curvature radius presumably causes a problem to arise on the performance of the strength, durability, and the like, of the pin. Thus, the parameters (r, r0) are selected so as to fall within a region on the upper-right side of the dashed line of the numeric value 1.0.

From the above-described two conditions (the deformation rate of pin length, the maximum value of contact pressure), the curvature parameter r and the initial curvature radius r0 are allowed to be selected from the obliquely shaded range in FIG. 16.

In FIG. 8, the open circles "O" indicate actually measured values. The dashed line is an approximate curve. The case where the contact point C is located at the center line s of the pin is indicated by point A2. In order to shift point A2 to point B2 of which the sound pressure at the time of point A2 is decreased by 3 dB, it is required to change the deviation rate of 0 to the deviation rate of 0.16. The actually measured value of noise is obtained under the condition that the speed ratio is 1, no load, an input rotation speed of 700 to 3000 rpm and a pulley clamping force corresponding to a low load is applied. By setting the deviation rate to the range on the right side of point B2, that is, a value larger than or equal to about 0.16, it can be expected to obtain an advantageous effect of 3 dB or larger improvement in the overall values in 3 to 5 kHz band as compared to the case where the initial contact point C0 is located at the center line of the pin.

If the deviation rate is increased, deformation of the pin 42 increases when the pin 42 is sandwiched by the input pulley 12 or the output pulley 14, so fatigue strength becomes a problem. The deviation rate at which the fatigue strength is an upper limit is about 0.38. Point E2 in FIG. 8 is an upper limit value in consideration of the fatigue strength.

By setting the deviation rate of the initial contact point C0 to 0.16 to 0.38, it is possible to satisfy the requirements of reduction in noise in the 3 to 5 kHz band and the fatigue strength.

The pitch of arrangement of the pins 42a, 42b in the circumferential direction of the chain 16 may be a constant pitch; instead, the pitch may also be a random pitch. By employing a random pitch, it is possible to reduce the first-order component of gripping of the pins in noise of the chain. With a random pitch, higher-order components increase; however, it is possible to suppress the increase in higher-order components by allowing the pins to easily deform. A random pitch can be employed by changing the interval between the openings 38a, 38b of each link for each link unit 46. When the interval between the openings 38a, 38b is changed, the length of each link 40 may be varied or locations of the openings 38a, 38b may be changed while the length of each link 40 remains unchanged.

A suitable mode of the invention will be described below. A chain for a continuously variable transmission, the chain being wound to span between two pulleys each having a pair of facing conical surfaces that are able to change a distance therebetween and going around the pulleys. The chain is formed by coupling chain elements as follows. Each chain element includes: a link unit configured such that a plurality of plate-shaped links, each having openings, are oriented in a circumferential direction of the chain and arranged in a width direction of the chain; and two pins respectively extending through the openings at both ends of the links, at least one of the pins contacting the conical surfaces at both ends. The chain elements are coupled such that the pin of one of the chain elements adjacent in the circumferential direction of the chain is passed through the opening of the links of the other one of the chain elements. A curvature radius of each end face of the pin, which contacts the conical surfaces, in a plane perpendicular to the circumferential direction of the chain increases from an initial contact point at the time when a load on the pin in a center line direction is 0 toward an inner side in a radial direction of each pulley.

What is claimed is:

1. A chain for a continuously variable transmission, the chain being wound to span between two pulleys, the two pulleys each having a pair of facing conical surfaces that are able to change a distance between the two pulleys, the chain being sandwiched between the pair of facing conical surfaces in each pulley, and the chain comprising:
a plurality of link units, each of the link units: (i) has at least one opening: (ii) extends lengthwise in a circumferential direction of the chain; and (iii) is plate-shaped, the link units being stacked in a width direction of the chain; and
a plurality of pins, each of the pins having: (i) a first end that extends through the at least one opening of a first link unit of the plurality of link units; and (ii) a second end that extends through the at least one opening of a second link unit of the plurality of link units, the first link unit being adjacent to the second link unit in a circumferential direction, wherein
each of the pins contacts the pair of facing conical surfaces at the first end of the pin and the second end of the pin, the first end of the pin contacting one facing conical surface of the pair of facing conical surfaces, and the second end of the pin contacting another facing conical surface of the pair of conical surfaces;
the first end of the pin and the second end of the pin each have an end face with a shape curve, which is defined as a curved shape of the end face of the first end and the second end of the pin;
the shape curve has a curvature radius in a plane perpendicular to the circumferential direction of the chain that is larger at a contact point located on an inner side of the end face in a pulley radial direction than an initial contact point; and the initial contact point is located at a vertex of the shape curve at a distance above a center line of each of the plurality of pins.

2. The chain according to claim 1, wherein the shape curve has a portion with a curvature radius that gradually increases from the initial contact point of the end face toward the inner side of the end face in the pulley radial direction.

3. The chain according to claim 1, wherein the plurality of pins are arranged at a random pitch in the circumferential direction of the chain.

4. The chain according to claim 1, wherein a location of the initial contact point in each of the plurality of pins deviates from the center line of each of the plurality of pins toward an outer side of the end face in the pulley radial direction.

5. The chain according to claim 4, wherein a rate of the deviation is larger than or equal to 0.16.

6. The chain according to claim 5, wherein the rate of the deviation is smaller than or equal to 0.38.

* * * * *